June 3, 1930.    W. TÖNHARDT    1,761,503
HAND EXCAVATOR
Filed Oct. 20, 1928
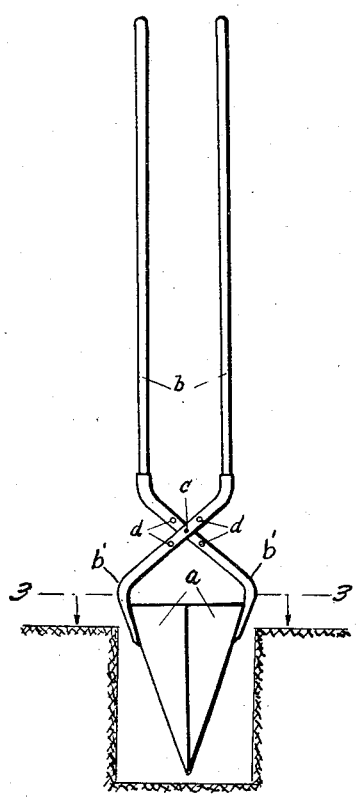
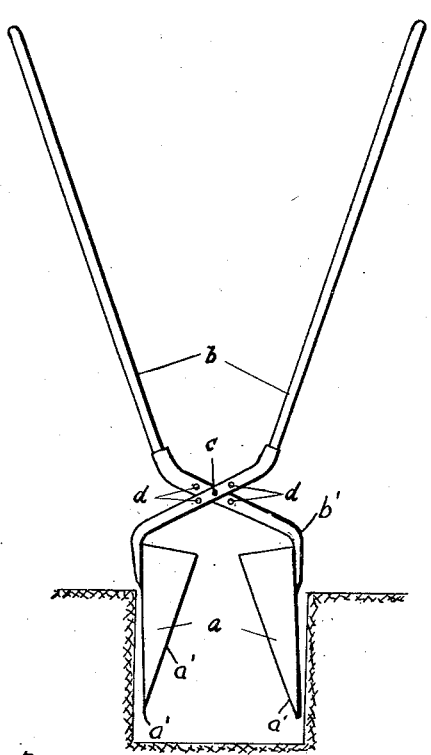
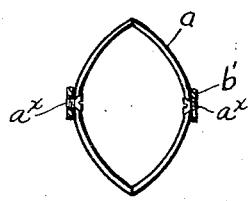
Inventor
W. TÖNHARDT
By
Atty.

Patented June 3, 1930

1,761,503

UNITED STATES PATENT OFFICE

WALTER TÖNHARDT, OF NEUMUNSTER, GERMANY

HAND EXCAVATOR

Application filed October 20, 1928. Serial No. 313,793.

The invention relates to hand tools used for digging holes for telegraph poles, lamp posts or the like where it is more convenient to remove as little dirt as possible and to have the hole as near the size of the post as possible.

The object of the invention is to provide a hand tool for digging holes in the ground of approximately the size of the post or pole to be set in the hole and which consists of two semi-circular blades arranged on pivoted handles which are used as diggers.

A further object is to shape the blades so that they may be brought together and form a conical housing to remove the dirt loosened by the digging operation.

The invention is illustrated in the accompanying drawings, in which:

Figure 1 is a view of the excavator with the blades closed.

Figure 2 is a similar view with the blades open.

Figure 3 is a sectional view on line 3—3 of Figure 1.

The excavator or hand digging tool is formed with blades $a$, which are approximately shaped like the sides of a hollow cone which has been divided on a line perpendicular to the base. The outside edges $a'$ are sharpened and are the cutting edges. Secured to the upper edges of the blades are the lower sections $b'$ of the handles which are used to manually operate the excavator. The lower sections of the handle have a series of holes $d$ through which a pivot pin $c$ is passed to form the said pivot. This pin may be passed through any other two holes so that the excavator is provided with an adjustable pivot point. The handles extend upwards at an angle to the lower section to form the upper sections $b$ which may be of any length.

The blades $a$ are interchangeably secured to the handles by bolts or the like $a^x$ and may be changed with ease right on the job for a blade which will do the work better. In the form shown the blades when closed form a cone-like housing which is used to draw the dirt from the hole.

In digging a hole the blades are spread apart by the handles to form a cylinder as shown in Figure 2 which is forced into the earth either by pressure or impact. The blades are then brought as near together as possible, retaining the earth which may be broken loose by rocking or twisting the excavator. By repeating the operation, holes of any desired depth may be dug with a minimum of dirt removed.

If desired, an adjusting or setting device may be provided on the handles so that the hole may be kept at a uniform diameter throughout its extent.

What is claimed to be new is:

A hand excavator comprising a pair of semi-conical shaped blades, handles removably secured to said blades, said handles being adapted to cross each other and adjacent the crossing position said handles being formed with a series of holes, and a pin adapted to pass through any two corresponding holes, thereby forming a pivotal point for the handles.

In testimony whereof I affix my signature.

WALTER TÖNHARDT. [L. S.].